March 17, 1959  A. L. QUINLAN  2,878,362
LOW VOLTAGE PERCUSSION WELDING GUN
Filed June 26, 1957  4 Sheets-Sheet 1
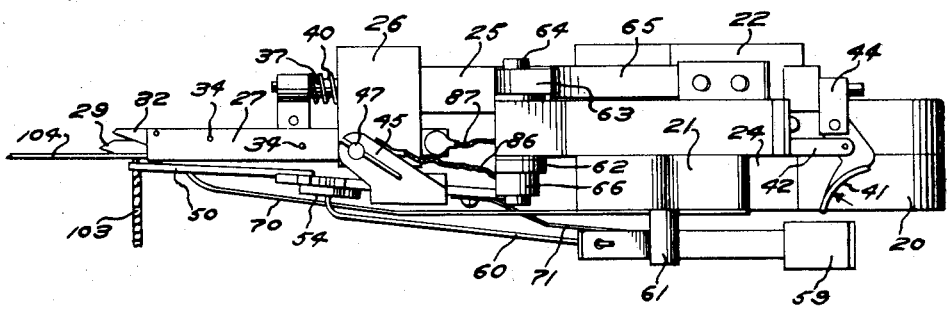
FIG. 1
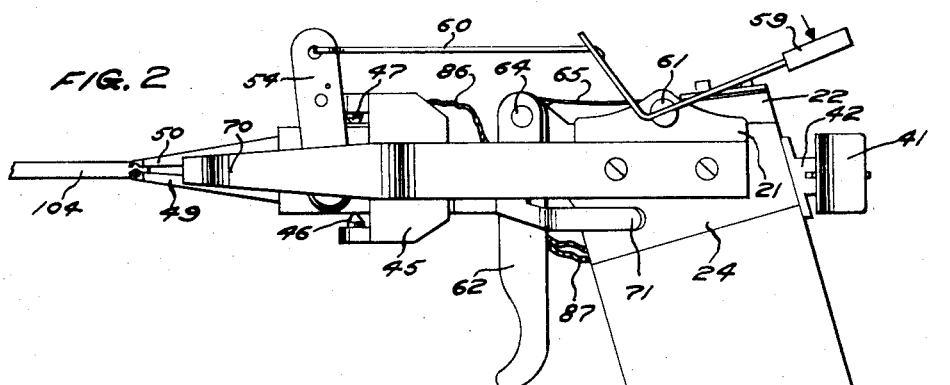
FIG. 2
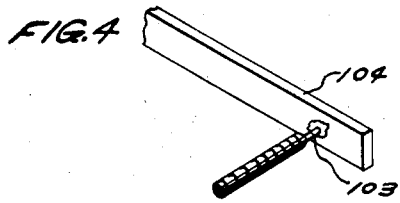
FIG. 3
FIG. 4
INVENTOR
A. L. QUINLAN
BY R. P. Miller
ATTORNEY March 17, 1959 A. L. QUINLAN 2,878,362
LOW VOLTAGE PERCUSSION WELDING GUN
Filed June 26, 1957 4 Sheets-Sheet 2
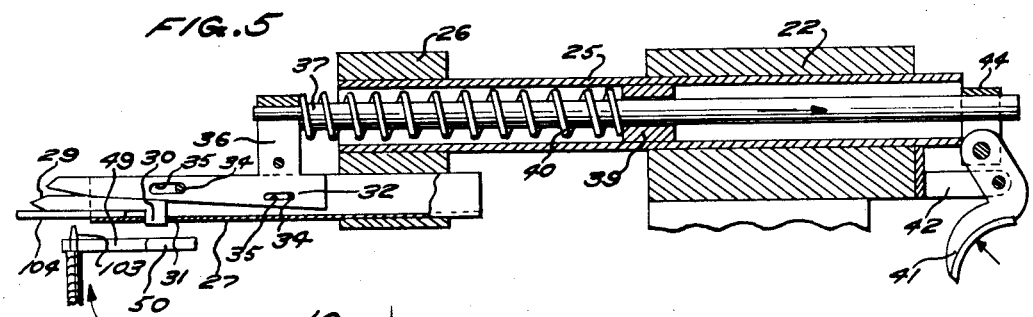
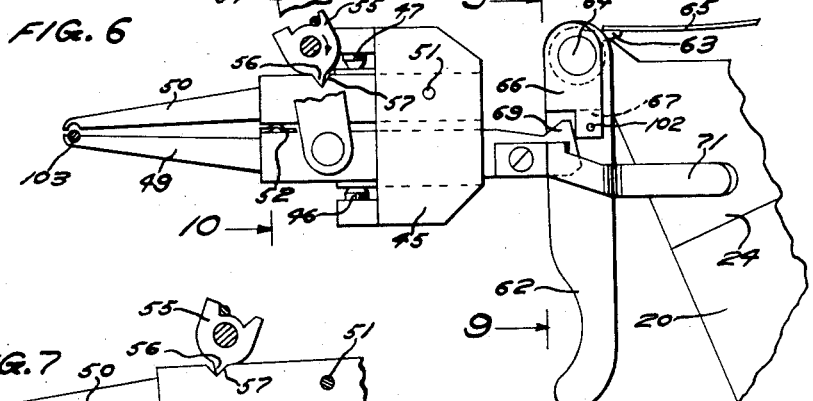
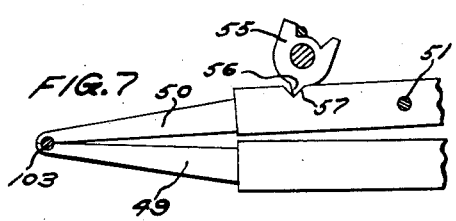
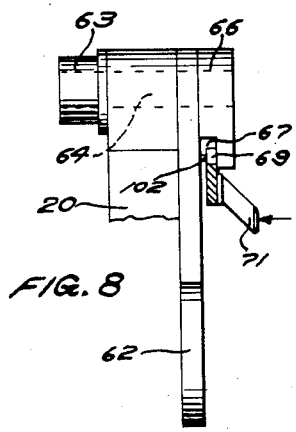
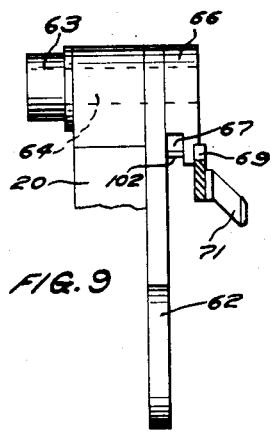
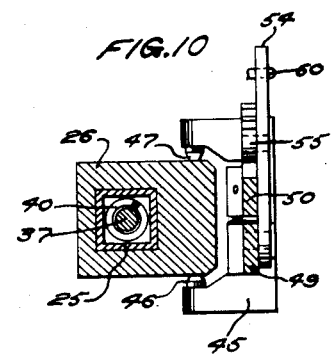
INVENTOR
A.L. QUINLAN
BY R.P. Miller
ATTORNEY March 17, 1959  A. L. QUINLAN  2,878,362
LOW VOLTAGE PERCUSSION WELDING GUN
Filed June 26, 1957  4 Sheets-Sheet 3

INVENTOR
A.L. QUINLAN
BY R. P. Miller
ATTORNEY

March 17, 1959     A. L. QUINLAN     2,878,362
LOW.VOLTAGE PERCUSSION WELDING GUN
Filed June 26, 1957     4 Sheets-Sheet 4

INVENTOR
A.L. QUINLAN
BY R. P. Miller
ATTORNEY

United States Patent Office 2,878,362
Patented Mar. 17, 1959

2,878,362

LOW VOLTAGE PERCUSSION WELDING GUN

Amos L. Quinlan, La Grange Park, Ill., assignor to Western Electric Company, Incorporated, New York, N. Y., a corporation of New York Application June 26, 1957, Serial No. 668,173

8 Claims. (Cl. 219—78)

This invention relates to percussion welding apparatus and more particularly to a hand-operated percussion welding gun for effecting electrical connection of wires and terminal members.

In manufacturing telephone central office equipment, large numbers of relays of various types as well as other components are utilized to form the switching equipment. Thousands of wires must be connected to the terminal members in order to complete the switching circuits. Because the number of electrical connections necessary is so large, the need for an apparatus which will rapidly and consistently form good electrical connections is obvious.

Connections of this type have been made in the past by soldering methods. The use of soldering methods, however, is quite slow since each wire and terminal to be connected must first be heated by the soldering tool. Also, to insure good electrical connections, it is necessary for the wire and terminals to be free of oxidation. To achieve this condition, the wires and terminals must be cleaned and tinned prior to the soldering operation. This of course introduces an additional step in the soldering process and thus increases the time consumed in effecting the connections.

It has also been proposed in the past to effect electrical connections between the wires and terminals by tightly wrapping the extremities of the wires about the terminals. In order to insure that good electrical connections are established when utilizing this method, it is necessary that the terminals be formed with reasonable accuracy. That is, the terminals must be formed with fairly sharp corners that will pierce the surface of the tightly wrapped wires in order to establish good electrical connections therebetween. Since the mating surfaces in connections formed in this manner are not fused together, they frequently oxidize with time and thus the quality of the electrical connection deteriorates. In some cases, the oxidation is sufficient to cause open circuits.

The problems inherent in the aforementioned prior art methods find their best solution in a method of forming electrical connections in which the parts to be connected are percussively welded together. Percussion welding is much faster than soldering, since the necessary application of heat is effected almost instantaneously, i. e. by the arc drawn as the parts to be welded are moving rapidly together. The cleaning and tinning step is also obviated since the presence of oxidation on the parts to be welded is immaterial when the method is practiced in the proper manner. Percussively welded connections also offer advantages over wrapped connections in that the terminals may be of any configuration and the connections thus established are not affected by future oxidation. Also, percussively welded connections are less bulky than wrapped connections and thus the relay terminals may be spaced much closer together. This advantage assumes great importance in the production of miniaturized apparatus.

It is therefore a primary object of this invention to provide an apparatus that will percussively weld electrical components together.

It is another object of this invention to provide a hand-operated percussion welding gun which will weld electrical conductors to relay terminals.

It is a further object of this invention to provide a percussion welding gun which utilizes a low non-lethal voltage.

It is yet another object of this invention to provide an apparatus which will grip an extremity of a wire and then move the extremity of said wire into abutting relationship with a terminal member whereby the wire and terminal member may be percussively welded together by a low voltage applied thereacross.

It is still another object of this invention to provide a percussion welding apparatus wherein the fixed electrode is formed by terminal gripping members and the movable electrode is formed of a pair of wire clamping jaws.

It is still another object of this invention to provide a percussion welding apparatus wherein the movable electrode is adapted to pierce the insulation surrounding an insulated wire.

With these and other objects in view, the present invention contemplates two pairs of clamping jaws mounted on a gun-type handle, for holding the wire and a terminal to be welded, and forming the two electrodes of a welding apparatus. A latch and trigger mechanism is provided to hold the wire clamping jaws against the urging of a spring which normally tends to move the wire clamping jaws toward the terminal clamping jaws. The trigger and latch mechanism includes means for connecting a low voltage high current source across the jaws forming the electrodes as the spring is moving the wire clamping jaws toward the terminal clamping jaws to effectuate a percussive weld. An alternative embodiment provides wire clamping jaws which will penetrate the insulation surrounding an unskinned wire and establish electrical contact therewith when the wire clamping jaws are closed.

Other objects, advantages and novel features of the invention will become apparent upon consideration of the following detailed description in conjunction with the accompanying drawings, wherein Fig. 1 is a top plan view of a percussion welding gun embodying the principal features of the invention;

Fig. 2 is a side elevation view of the percussion welding gun with a wire and a terminal in position to be welded and with the wire clamping jaws illustrated in an open position;

Figs. 3 and 4 are perspective views illustrating the manner in which the wire is moved relative to the terminal in order to effectuate a percussive weld;

Fig. 5 is a fragmentary top plan view in full section illustrating the mechanism utilized to grip a terminal member;

Fig. 6 is a fragmentary side elevation view illustrating the mechanism used to actuate the wire clamping jaws and the cocking mechanism used to position a wire gripped in the wire clamping jaws a predetermined distance away from the terminal clamping jaws;

Fig. 7 is a fragmentary side elevation similar to Fig. 6 and illustrating a toggle mechanism in a position holding the wire clamping jaws closed about the wire;

Figs. 8 and 9 are two views taken along the line 9—9 of Fig. 6 and illustrate the trigger and latching bar in the cocked and released positions;

Fig. 10 is a sectional view taken along the line 10—10 of Fig. 8 and illustrates the pivotal mounting arrangement used for the movable wire clamping jaws;

Figure 11:
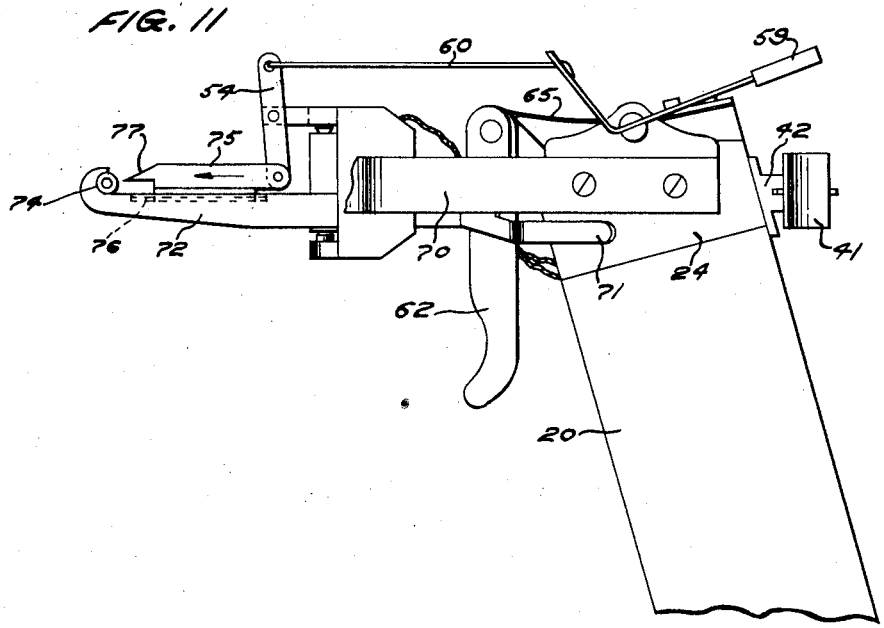
Fig. 11 is an alternative embodiment of the invention utilizing wire clamping jaws which make electrical contact with unskinned wires.

Attention now is directed to the drawings, and in particular to Figs. 1 and 2, wherein is disclosed a preferred embodiment of the present invention. The welding gun is formed of a handle 20 mounting supporting members 21 and 22, the supporting member 21 being positioned within a recessed portion 24 formed in the handle 20. A first extremity of a tube 25 (see Fig. 5) is positioned within an aperture in the supporting member 22 and mounts a pivot block 26 on the opposite extremity thereof. The handle 20, supporting members 21 and 22, and the pivot block 26 are all made of an electrically insulating material such as phenol fiber.

A U-shaped terminal clamping jaw 27 is secured within an aperture in the pivot block 26 and is disposed with the open end of the U facing upwardly, as viewed in Figs. 1 and 5. A movable terminal clamping member 29 is slidably positioned within the jaw 27 and is prevented from falling out of the jaw by means of a projection 30 thereon which is positioned within an aperture 31 (Fig. 5) formed in the bottom of the jaw 27.

A camming member 32 is likewise slidably positioned within the jaw 27 and is permitted a limited amount of movement longitudinally of the jaw 27 by means of pins 34 secured to the sides of the jaw and passing through slots 35 formed in the camming member 32. The camming member 32 is rigidly attached through a depending lug 36 to a clamping rod 37. The rod 37 is coaxial with the tube 25 and is slidably supported by a bushing 39 (Fig. 5) secured within the tube 25. A compression spring 40 is interposed between the lug 36 and bushing 39 and normally urges the rod 37 to the left as viewed in Fig. 5. A terminal clamping lever 41 is pivotally mounted on the handle 20 by means of bracket 42 and is pivotally connected to the rod 37 by means of link 44.

A pivot member 45 is mounted on block 26 by means of pivot pins 46 and 47 (Figs. 6 and 10) and has a fixed wire clamping jaw 49 rigidly secured thereto. A movable wire clamping jaw 50 is mounted on the member 45 (Fig. 6) by means of a pivot pin 51 and is normally urged away from the fixed jaw 49 by means of a spring member 52. A clamping lever 54 is pivotally mounted on the fixed jaw 49 and carries a rotatably mounted link 55 thereon. The link 55 is provided with a projection 56 which is positioned within an indentation 57 formed in the upper surface of the movable jaw 50. The free extremity of the lever 54 is connected to a wire clamping lever 59 by means of a connecting rod 60. The handle 59 is pivotally mounted on supporting member 21 by means of a pivot pin 61.

A trigger 62 is pivoted on the handle 20 by means of a pivot pin 64 and is normally urged to rotate in a clockwise direction (Fig. 6) by means of a leaf spring 65 which is secured to the handle 20 and against a projection 63 extending from the trigger 62. The trigger 62 is provided with a boss 66 having a recess 67 (Figs. 8 and 9) formed therein. The recess 67 is adapted to receive a projection 69 formed on a rearward extremity of the jaw 49.

As viewed in Fig. 1, a leaf spring 70 is rigidly secured to the member 21 and bears against the jaws 49 and 50 to normally cause these jaws and the member 45 to rotate in a clockwise direction. A latching lever 71 is secured to the rearward extremity of the jaw 49 to provide a means of causing the jaws 49 and 50 and pivot member 45 to rotate in a counterclockwise direction, against the urging of the spring 70, in order to engage the projection 69 in the recess 67.

Figure 12:
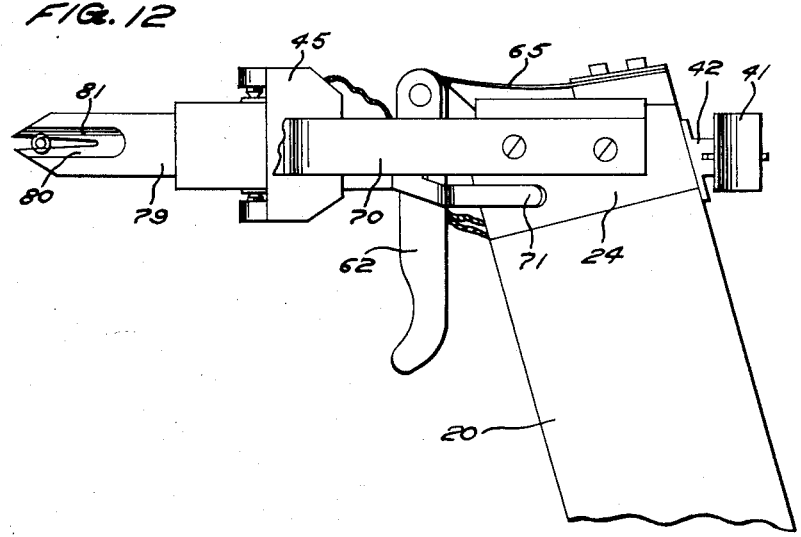
Fig. 12 is another alternative embodiment of the invention which is also adapted for use with unskinned wires.

Figs. 11 and 12 illustrate percussion welding guns which are structurally identical to the previously described gun, with the exception of the wire clamping jaws. The jaws shown in these two views are designed to be used in instances where unskinned wire is to be utilized. In Fig. 11 a fixed wire clamping jaw 72 is provided with an arcuate wire receiving indentation 74. A movable wire clamping jaw 75 is slidable in a groove 76 formed in the fixed jaw 72 and is adapted to be actuated through the action of clamping lever 54, connecting rod 60, and lever 59. The jaw 75 is provided with a sharp point 77 which is designed to pierce the insulation to establish electrical contact with a wire to be welded.

In Fig. 12 the wire clamping jaw is formed of a bifurcated member 79 which forms a tapered slot; the sides of which are knife edges 80 and 81. In using a jaw of this type, the wire is wedged into the tapered slot so that the knife edges 80 and 81 penetrate the insulation and establish electrical contact with the wire.

*Operation*

Figure 13:
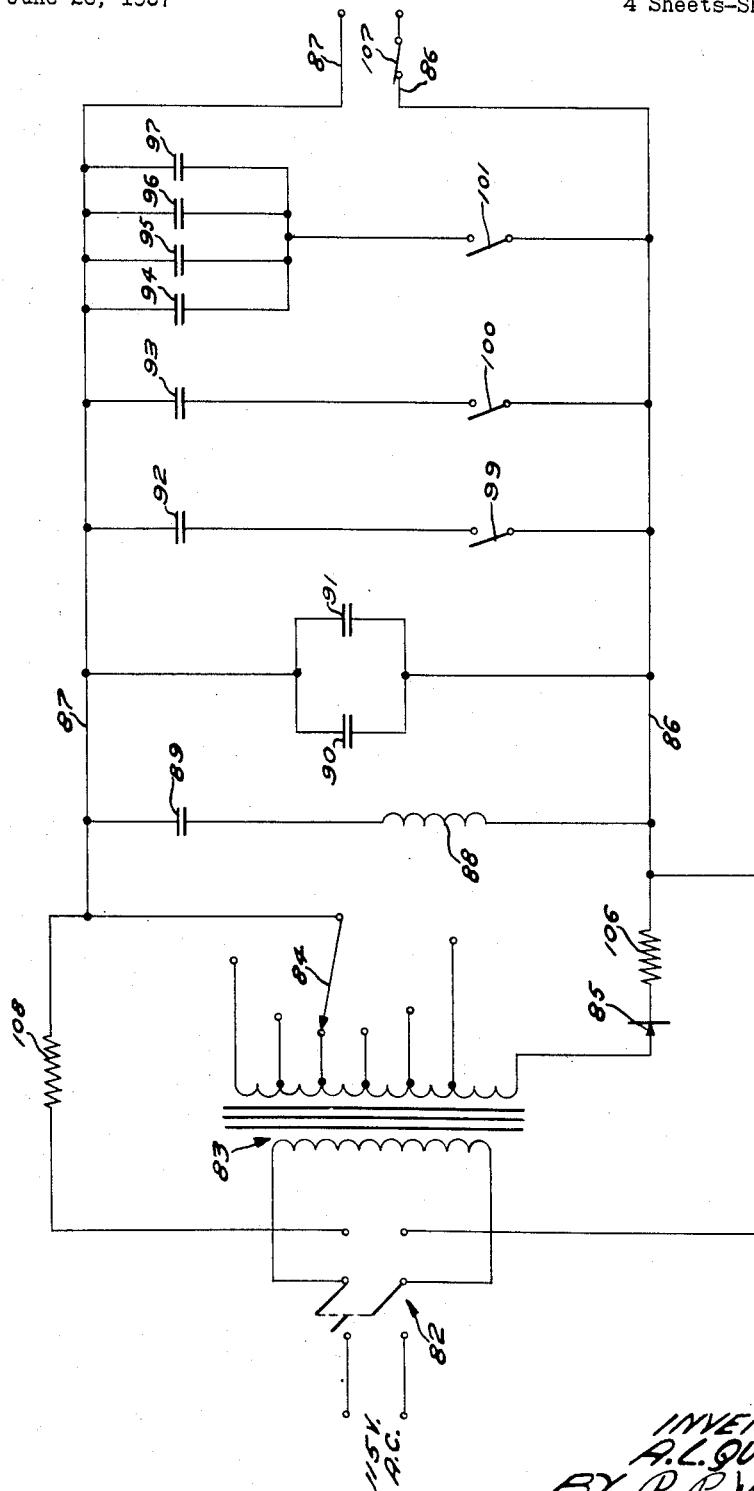
Fig. 13 is a schematic wiring diagram of the welding circuit utilized in the present invention.

In order that a better understanding of the invention may be had, its manner of operation will now be described. To prepare the device for operation, a power switch 82 (Fig. 13) is closed to connect an A. C. power line to the primary winding of a transformer 83. The current induced in the secondary winding of the transformer 83 is rectified by a rectifier 85 and the resulting potential is applied across lines 86 and 87 which are connected to the wire clamping jaws 49 and 50 and terminal clamping jaws 27 and 29, respectively (Fig. 1). The transformer 83 is provided with a tapped secondary and a selector 84 to permit some variation in the potential which is applied across the lines 86 and 87. Capacitors 89, 90 and 91 immediately begin charging and the remaining capacitors 92 to 97, inclusive, may or may not begin charging, depending upon the positions of switches 99, 100 and 101. The current flow continues until all of the connected capacitors have been fully charged. This configuration of capacitors and switches permits the value of the combined capacitance to be varied.

As previously indicated, the handle 20, supporting members 21 and 22, and pivot block 26 are all made of electrically insulated material to insulate the two pairs of clamping jaws from each other. This arrangement prevents the discharge of the capacitors through the two pairs of clamping jaws at this time.

The next step is to cock the wire clamping jaws by means of the latching lever 71. This is accomplished by pushing the latching lever 71 toward the handle 20 until a projection 69 is aligned with the recess 67 (Fig. 8). The leaf spring 65 then causes the trigger 62 to rotate clockwise (Fig. 6) until the projection 69 strikes against a pin 102. The outer wall of the recess 67 bears against the projection 69 and prevents the return of the lever 71 to its outer position until the trigger has been rotated sufficiently to permit the projection 69 to clear the recess. Pressing on the latching lever 71 has caused the jaws 49 and 50 to pivot slightly away from the terminal clamping jaws and against the urging of the spring 70. The wire clamping jaws are held in this position until released by the trigger.

A wire 103, which has previously been skinned a predetermined length, is inserted into a notch formed in the fixed wire clamping jaw 49 so that the insulation on the unskinned portion of the wire abuts against the outside surface of the jaw 49 (Fig. 4). The lever 59 is then pushed in the direction indicated by the arrow in Fig. 2 to pivot the clamping lever 54 in a clockwise direction. This motion of the clamping lever 54 causes the link 55 to depress the jaw 50 and thus grip the wire 103 in the notches formed in the extremities of the jaws 49 and 50 (Fig. 7). The wire is now ready for the welding operation.

The terminal clamping lever 41 is next moved in the direction indicated by the arrow in Fig. 5 to retract the rod 37 and thus moves the camming member 32 to the right until the pins 34 strike the opposite ends of the slots 35. The gun is then manipulated to insert a terminal 104 into the open end of the terminal clamping jaw 27. Since the camming member 32 is retracted, the movable member 29 is permitted a limited degree of movement which permits insertion of the terminal. After the terminal 104 has been positioned within the jaw 27, the handle 41 is released to permit the camming member to move to the left and engage the movable clamping member 29. The camming member 32 wedges the member 29 against the terminal 104 and presses the terminal firmly against the clamping jaw 27. The terminal is now in position for the welding operation.

The next step is to pull the trigger 62 toward the handle 20. When the projection 69 has completely cleared the recess 67, the entire wire clamping assembly is free to rotate. The leaf spring 10, pressing against jaws 49 and 50, causes the jaws and the wire held therein to pivot rapidly toward the terminal gripped in the terminal clamping jaws. As the wire 103 approaches the terminal 104, an arc will be drawn therebetween as the capacitors 90 to 97, inclusive, discharge. An inductor 88 is connected in series with the capacitor 89 to slightly retard the discharge of this capacitor. This sustains the flow of discharge current for a slightly longer period of time to insure sufficient heating for a proper weld.

Since the voltage used in practicing the present invention is approximately 50 volts, it is necessary that the wire be formed with a pointed tip in order that an arc may be drawn. The tip resulting from cutting the wire with a pair of diagonal cutters has been found to give excellent results. The arc which is drawn just prior to impact serves to melt the tip of the wire and a small localized area on the terminal. Upon impact, these softened portions fuse together and the weld is thus effected.

Once the weld has been completed, the connection between the wire 103 and terminal 104 serves to short circuit the leads 86 and 87. A resistor 106 is connected in series with the rectifier 85 to prevent the flow of excess currents both during the time the capacitors are being charged and the time between the completion of the weld and the removal of the wire and terminals from the clamping jaws. A switch 107 may be included in the line 86 to open the circuit upon completion of the weld to preclude the shorting of the transformer secondary. This switch would be closed by the trigger 62 immediately prior to the time at which the trigger released the terminal clamping assembly and would open again immediately upon release of the trigger.

The wire 103 and terminal 104 are released from their respective clamping jaws by reversing the aforementioned procedure. As soon as the wire and terminal have been removed from the jaws of the gun, the capacitors again begin charging since they are no longer shorted out through the wire 103 and terminal 104. The gun is now ready to receive another wire and terminal which may be welded together in the same manner as was previously described. When the gun is not to be used for a period of time, the power switch 82 is thrown to its other position to discharge the capacitors through resistor 108 and the primary winding of the transformer 83 to eliminate a potential safety hazard.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A hand tool for percussively welding articles together comprising a handle, first clamping means fixed to said handle for gripping a first article, manually operable means for actuating said first clamping means, second clamping means movably mounted on said handle for gripping a second article, manually operable means for actuating said second clamping means, releasable means on said handle for holding said second clamping means a predetermined distance away from said first clamping means, resilient means operable upon actuation of said releasable means for moving said second clamping means toward said first clamping means to bring articles gripped therein into percussive engagement, and means for applying a non-lethal welding potential across said first and second clamping means.

2. In a hand tool for percussively welding wires to terminal members, an electrically insulating handle, a terminal positioning member fixed to said handle, a terminal clamp connected to said positioning member, a manually operable linkage for moving said clamp toward said positioning member to clamp a terminal therebetween, wire clamping means movably mounted on said handle for gripping a wire, manually operable means for actuating said clamping means, releasable means on said handle for holding said wire clamping means a predetermined distance away from said terminal positioning member, resilient means operable upon actuation of said releasable means for moving said wire clamping means toward said positioning member to bring the wire and terminal gripped therein into percussive engagement, and a low voltage high current source connected across said wire clamping means and said positioning member.

3. A hand tool for percussively welding wires to terminal members comprising a handle of electrically insulating material, terminal clamping means fixed to said handle for gripping a terminal, manually operable means for actuating said terminal clamping means, a pair of wire clamping jaws movably mounted on said handle, a manually operable linkage for actuating said jaws to clamp a wire therein, latching means on said handle for holding said clamping jaws a predetermined distance away from said terminal clamping means, resilient means operable upon release of said latching means for moving said wire clamping jaws toward said terminal clamping means to bring the wire and terminal gripped therein into percussive engagement, and means for applying a non-lethal welding potential across said wire clamping jaws and said terminal clamping means.

4. In a hand tool for percussively welding wires to terminal members, an electrically insulating handle, terminal clamping means mounted on said handle for gripping a terminal, manually operable means for actuating said terminal clamping means, wire clamping means movably mounted on said handle for gripping a wire, manually operable means for actuating said wire clamping means, a latch on said handle for engaging said wire clamping means to position said wire clamping means a predetermined distance from said terminal clamping means, a trigger for releasing said latch, resilient means operable upon release of said latch for moving said wire clamping means toward said terminal clamping means to bring a wire and a terminal gripped therein into percussive engagement, and a low voltage high current source connected across said wire clamping means and said terminal clamping means.

5. A hand tool for percussively welding wires to terminal members comprising a handle of electrically insulating material, a terminal positioning member secured to said handle, a terminal clamp connected to said positioning member, a manually operable linkage for moving said clamp toward said positioning member to grip a terminal therebetween, a pair of wire clamping jaws movably mounted on said handle, a manually operable linkage for actuating said jaws to grip a wire therein, latching means on said handle for holding said wire clamping jaws a predetermined distance away from said positioning means, a leaf spring for moving said wire clamping jaws toward said positioning member upon release of said latching means, and means for applying a non-lethal welding potential across said wire clamping jaws and said positioning member.

6. In a hand tool for percussively welding wires to terminal members, an electrically insulating handle, a terminal positioning member fixed to said handle, a terminal clamp connected to said positioning member, a manually operable mechanism for camming said clamp toward said positioning member to grip a wire therebetween, wire clamping means movably mounted on said handle, a manually operable mechanism for actuating said wire clamping means, a latch on said handle for engaging said wire clamping means to position said wire clamping means a predetermined distance from said terminal positioning member, a trigger for releasing said latch, resilient means operable upon release of said latch for moving said wire clamping means toward said terminal positioning member to bring a wire and a terminal gripped therein into percussive contact, and means for applying a non-lethal welding potential across said wire clamping means and said terminal positioning member.

7. A hand tool for percussively welding wires to terminal members comprising a handle of electrically insulating material, terminal clamping means secured to said handle for gripping and positioning a terminal, a manually operable mechanism for actuating said terminal clamping means, a pair of wire clamping jaws movably mounted on said handle, a manually operable linkage for actuating said jaws to clamp a wire therein, a latch on said handle for holding said wire clamping jaws a predetermined distance away from said terminal clamping means, a trigger for releasing said latch, resilient means operable upon release of said latch for moving said wire clamping jaws toward said terminal clamping means to bring a wire and a terminal gripped therein into percussive engagement, and a low voltage high current source connected across said wire clamping jaws and said terminal clamping means.

8. In a hand tool for percussively welding wires to relay terminals, a handle formed of an electrically insulating material, an apertured terminal positioning member secured to said handle for receiving the extremity of a terminal, a terminal clamp positioned within the aperture and connected to the positioning member, a manually operable linkage including a cam for camming said clamp toward a wall of the aperture to clamp a terminal extremity therebetween, a pair of notched wire clamping jaws pivotally mounted on said handle for oscillation about an axis perpendicular to the longitudinal axis of said terminal positioning member, a manually operable mechanism for opening and closing said jaws to grip a wire in the notches therein, a latch on said handle for engaging a projection on said jaws to hold said jaws a predetermined distance away from said positioning member, a trigger for releasing said latch, a leaf spring mounted on said handle and bearing against said jaws for rotating said jaws toward said positioning member to bring a wire and a terminal gripped therein into percussive engagement, and means for applying a non-lethal welding potential across said jaws and said positioning member.

References Cited in the file of this patent
UNITED STATES PATENTS

| | | |
|---|---|---|
| 2,145,275 | Pfanstiehl | Jan. 31, 1939 |
| 2,430,260 | Trott | Nov. 4, 1947 |
| 2,442,423 | Lomax | June 1, 1948 |
| 2,459,847 | Spencer | Jan. 25, 1949 |
| 2,467,379 | Graham | Apr. 19, 1949 |
| 2,737,564 | Barnes | Mar. 6, 1956 |